J. H. Hendrick,
Bee-Hive.
No. 111,451. Patented Jan. 31, 1871.

Witnesses
Inventor

UNITED STATES PATENT OFFICE.

JOHN H. HENDRICK, OF CLINTON, ILLINOIS.

IMPROVEMENT IN BEE-HIVES.

Specification forming part of Letters Patent No. 111,451, dated January 31, 1871.

*To all whom it may concern:*

Be it known that I, JOHN H. HENDRICK, of Clinton, in the county of De Witt, and in the State of Illinois, have invented a new and useful Improvement in Bee-Hives; and I do hereby declare that the following is a full, clear, and exact description thereof, reference being had to the annexed drawing, making part of this specification, in which—

Figure 1:
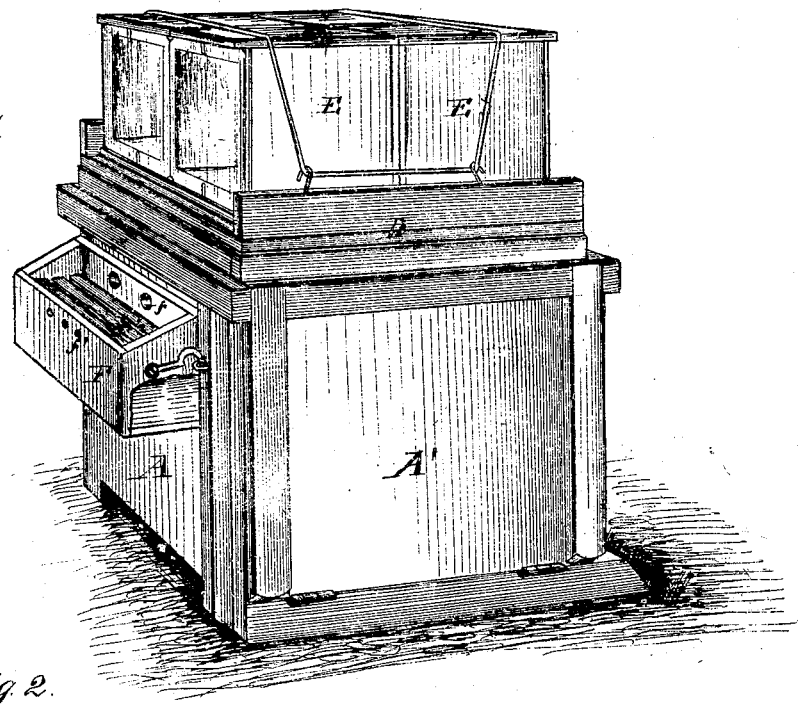
Figure 2:
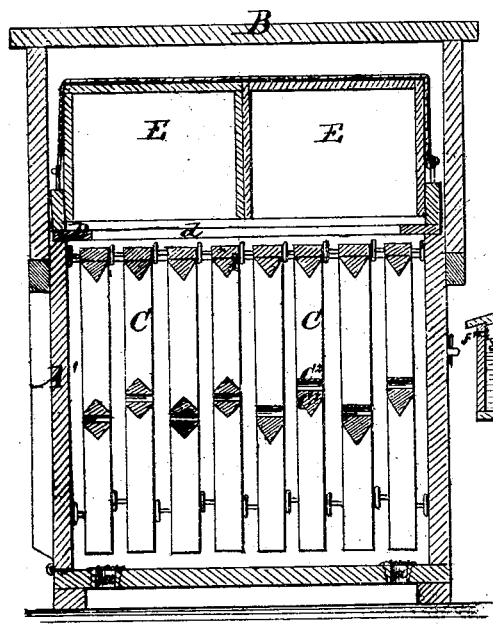
Figure 3:
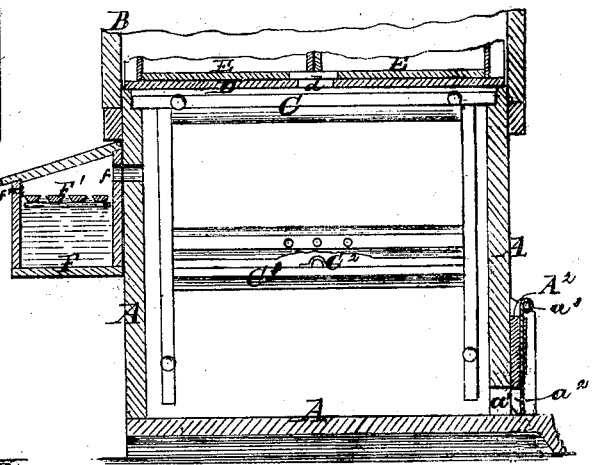

Figure 1 is a perspective view of my improved bee-hive. Fig. 2 is a vertical section. Fig. 3 is a similar section, taken at right angles to the one shown in Fig. 2.

The same letters are used in all the figures in the designation of identical parts.

My invention relates to bee-hives; and the improvements consist in combining with such a hive a feed-box of peculiar construction, as also in several peculiarities of construction and arrangement of various parts thereof, as will be more specifically set forth hereinafter.

To enable those skilled in the art to make and use my invention, I will proceed to describe its construction and operation.

In the annexed drawing, A represents the main body of the hive, constituting a rectangular box, the bottom of which is raised a short distance from the ground by suitable strips of wood under it on three sides, the fourth side being left open to permit of a free circulation of air, which may enter the hive through openings $a$ in its bottom, said ventilating-holes being covered by wire-gauze, in the ordinary manner.

In winter, in cold or stormy weather, the air-opening on one side of the hive may be readily closed by earth or otherwise. A slot, $a^1$, extending entirely across it, is made in one side at the bottom, ordinarily covered by a slide, $A^2$, which is provided with an aperture, $a^2$, to serve as the entrance and exit for the bees. Said aperture $a^2$ may be closed by a slide, $a^3$.

The slot $a^1$ is provided in order that the hive may be readily cleaned without disturbing the bees.

One side of the box or main body of hive (marked $A^1$) is hinged at the base, affording a ready means of access to the comb-frames.

B represents the cap or upper portion of the hive, inclosing the surplus-honey boxes. It rests upon cleats around the upper end of the body A, to which it may be further secured by means of hooks and staples.

C C represent the comb-frames, which hang suspended in the main body, their upper cross-bars resting at the ends upon ledges on opposite sides thereof, as shown clearly in Fig. 3. Any suitable number of these frames is employed, and they are kept the proper distance apart from each other by means of broad-headed nails $c$, driven into their sides in the usual way.

Some of the lower cross-bars are set diagonally in the side bars of the frames, with holes bored through them to permit of the passage of the bees, which form of construction I usually employ; but in some cases I prefer to have the upper side of the cross-bars flat, as shown at $C^1$, Figs. 2 and 3, which is preferable where comb is to be transferred from one frame to another, because such comb can be more easily attached to them.

With such flat cross-bars I use loops $C^2$ for the passage of the bees, said loops being made of tin, by preference, and provided with short flanges by which to fasten them, as shown in Fig. 3.

D is a plate resting upon the upper end of the main body A of the hive, directly above the comb-frames, and provided with a long central slot, $d$, running across the comb-frames, and communicating with slots in the surplus-honey boxes. These latter (marked E in the drawing) are constructed in the ordinary manner, and may be held in position upon the plate or board D, as shown in Fig. 1, if so desired.

F is a feed-box, attached to one side of the main body by means of hooks and staples, as shown, or in any other convenient manner. In the side next to the hive holes $f$ are bored opposite similar holes in the hive, through which the bees may thus pass in and out. It is also provided with gauze-covered ventilating-holes $f'$, and its top plate is, in practice, to be made entirely of glass, or, at least, have windows. Suitable food, such as molasses and sugar, is placed in this box; and in order that the bees may be fed without alighting directly on the food, I provide a float, $F'$, consisting of a number of wooden slats held together by cross-strips nailed under them. The bees may thus alight on the float and feed through the interstices.

Having thus described my invention, what I claim, and desire to secure by Letters Patent, is—

The bee-hive herein described, consisting of the main body A, with drop-door A¹, comb-frames C, board D, surplus-honey boxes E, and feed-box F F', all the parts being constructed and arranged substantially as set forth.

The above specification signed by me this 16th day of February, 1870.

JOHN H. HENDRICK.

Witnesses:
JOHN J. McGRAW,
HENRY BROWN.